United States Patent
Huang

(10) Patent No.: US 9,238,389 B2
(45) Date of Patent: Jan. 19, 2016

(54) ADJUSTABLE TIRE PRESSURE DETECTOR

(71) Applicant: SUNG JUNG MINUTE INDUSTRY CO., LTD., Hsinchu County (TW)

(72) Inventor: Wen-Huo Huang, Hsinchu County (TW)

(73) Assignee: SUNG JUNG MINUTE INDUSTRY CO., LTD, Hsinchu County (TW)

( * ) Notice: Subject to any disclaimer, the term of this patent is extended or adjusted under 35 U.S.C. 154(b) by 163 days.

(21) Appl. No.: 14/044,115

(22) Filed: Oct. 2, 2013

(65) Prior Publication Data

US 2015/0090025 A1    Apr. 2, 2015

(51) Int. Cl.
  *B60C 23/02*  (2006.01)
  *B60C 23/04*  (2006.01)

(52) U.S. Cl.
  CPC ............. *B60C 23/0494* (2013.01); *B60C 23/04* (2013.01)

(58) Field of Classification Search
  None
  See application file for complete search history.

(56) References Cited

U.S. PATENT DOCUMENTS

| 7,021,133 | B1* | 4/2006 | Hsu ............................. 73/146.8 |
| 2008/0302425 | A1* | 12/2008 | Hettle et al. ................. 137/227 |
| 2010/0064791 | A1* | 3/2010 | Chuang et al. ............... 73/146.8 |
| 2010/0064792 | A1* | 3/2010 | Chuang et al. ............... 73/146.8 |
| 2012/0118057 | A1* | 5/2012 | Rigney et al. ............... 73/146.8 |
| 2013/0042676 | A1* | 2/2013 | Korus .......................... 73/146.3 |

FOREIGN PATENT DOCUMENTS

TW    M405977    6/2011

* cited by examiner

*Primary Examiner* — Andre Allen
(74) *Attorney, Agent, or Firm* — Muncy, Geissler, Olds & Lowe P.C.

(57) ABSTRACT

An adjustable tire pressure detector is installed on a tire rim, and includes a detector body, a gas intake nozzle, and a gas nozzle assembly member for fastening the gas intake nozzle onto the detector body. The detector body includes a housing and a gas nozzle assembly portion. The gas nozzle assembly portion includes two parallel limiting contact surfaces, an assembly surface connecting the two limiting contact surfaces and including an opening, and an assembly space surrounded by the two limiting contact surfaces and the assembly surface. The gas intake nozzle includes a coupling section inserted in the assembly space and a gas intake section connected to the coupling section. The coupling section includes two assembly contact surfaces corresponding to the limiting contact surfaces, and an arched assembly surface connecting the two assembly contact surfaces, including a ventilation hole and being in line contact with the assembly surface.

6 Claims, 6 Drawing Sheets

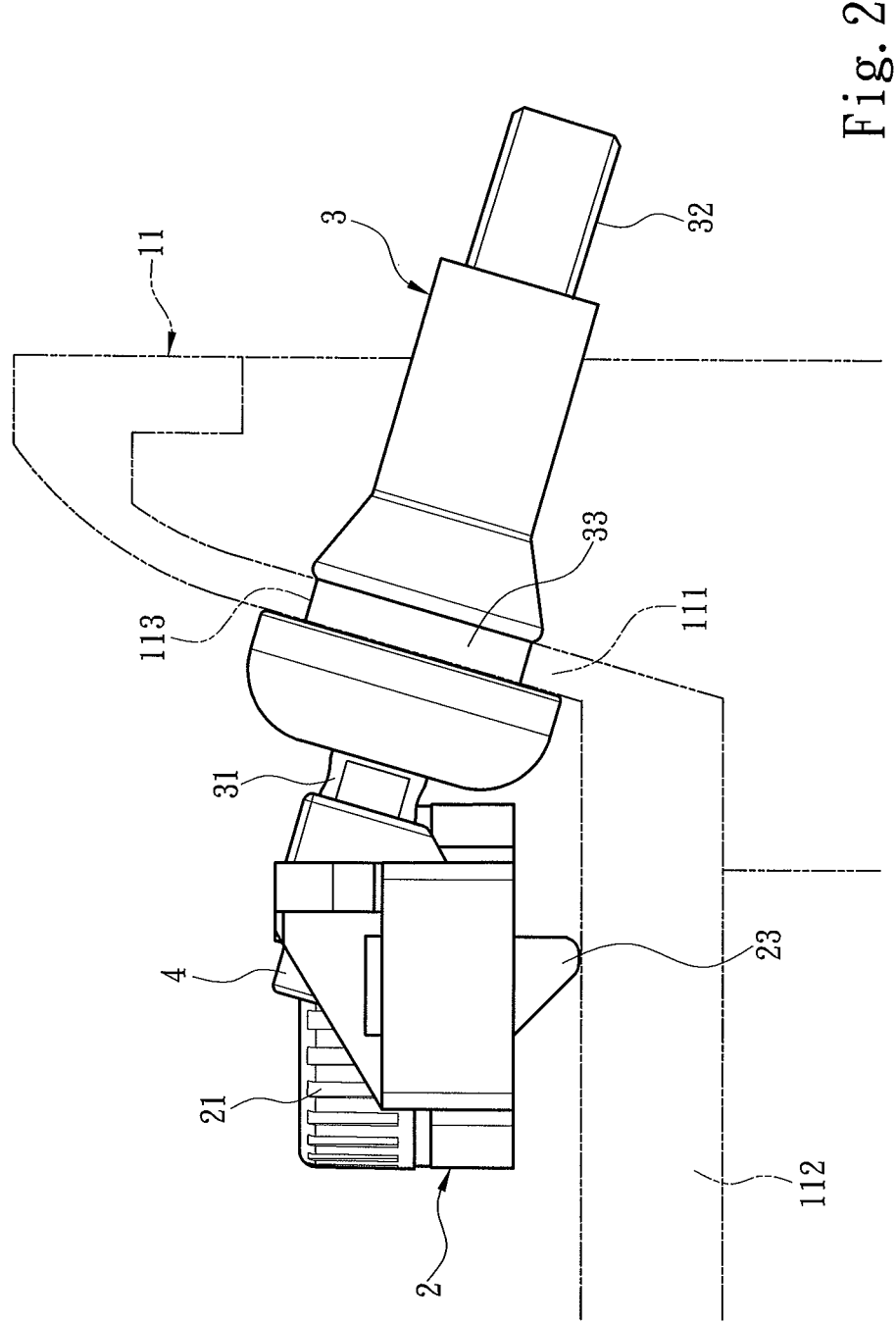

ADJUSTABLE TIRE PRESSURE DETECTOR

FIELD OF THE INVENTION

The present invention relates to an adjustable tire pressure detector, and particularly to an adjustable tire pressure detector adapted to various types of tire rims.

BACKGROUND OF THE INVENTION

A tire pressure sensor, disposed on a tire rim of a vehicle, constantly monitors the gas pressure and temperature of the tire, and outputs sensed values to a vehicle display device or a vehicle status warning device through wireless transmission. As such, a driver of the vehicle may be informed of the tire pressure status in real-time during a driving process, so as to prevent accidents resulted by tire abnormalities.

A tire sensor is usually connected to a gas intake nozzle disposed on an assembly hole of the tire rim. The gas intake nozzle serves as an input end for a user to pump gas into the tire. As sizes of tire rims may vary according to different designs and different vehicle types, in order to securely attach a tire pressure sensor on a tire rim after installing the tire pressure sensor, a manufacturer needs to perform structural adjustments to the tire pressure sensor for each vehicle model or each uniquely designed tire rim individually. Consequently, production costs are increased. In view of the above issue, a tire pressure sensor capable of appropriately adjusting according to the shape of a tire rim is proposed. For example, as a tire pressure sensor disclosed in the Taiwan Utility Model No. M405977, a gas intake nozzle thereof is disposed with an arched outer adjustment surface. Besides, the tire pressure sensor is further disposed with an arched inner adjustment surface at a position connecting to the gas intake nozzle. The outer adjustment surface and the inner adjustment surface are complementary in shape to perform relative sliding movements. In the above disclosure, the gas intake nozzle is fastened on the tire pressure sensor by penetrating a screw bolt through the outer adjustment surface of the gas intake nozzle and the inner adjustment surface of the tire pressure sensor. Thus, through such structural features, the tire pressure sensor in the above disclosure becomes suitable for any desired tire rim. However, since the gas intake nozzle is able to slide relatively to the tire pressure sensor and the two are fastened merely by one single screw bolt, jittering during a driving process may cause the gas intake nozzle to waver relatively to the tire pressure sensor. Under a long-term use, the gas intake nozzle is prone to loosening or even disengagement from the tire pressure sensor.

SUMMARY OF THE INVENTION

Therefore the primary object of the present invention is to provide an adjustable tire pressure detector that can be installed on different types of tire rims.

To achieve the above object, an adjustable tire pressure detector is provided by the present invention. The adjustable tire pressure detector is installed on a tire rim. The tire rim includes two fastening sections at two sides to engage with a tire bead of a tire, a connecting section connecting the two fastening sections, and an assembly through hole disposed at one of the fastening sections. The adjustable tire pressure detector includes a detector body, a gas intake nozzle, and a gas nozzle assembly member. The detector body is disposed at the fastening sections, and includes a housing and a gas nozzle assembly portion formed on the housing. The gas nozzle assembly portion includes two parallel limiting contact surfaces, an assembly surface connecting the two limiting contact surfaces and including an opening facing the assembly through hole, and an assembly space surrounded by the two limiting contact surfaces and assembly surface. The gas intake nozzle includes a coupling section inserted into the assembly space, and a gas intake section extending from the coupling section towards the assembly through hole. The coupling section includes two parallel assembly contact surfaces corresponding to and tightly pressing against the limiting contact surfaces, and an arched assembly surface connecting the two assembly contact surfaces, including a ventilation hole corresponding to the opening and being in line contact with the assembly surface. The gas nozzle assembly member penetrates through the opening to couple with the ventilation hole, so as to fasten the gas intake nozzle onto the detector body.

In one embodiment, the detector body further includes at least one support section extending towards the connection section.

In one embodiment, the support section includes a buffer member abutting against the connecting section.

In one embodiment, the gas nozzle assembly member further includes an outer screw thread, and the ventilation hole includes an inner screw thread for screwing with the outer screw thread.

In one embodiment, the gas intake nozzle further includes a limiting fixing section disposed between the coupling section and the gas intake section to engage with the assembly through hole.

In one embodiment, the gas intake nozzle further includes a gas outlet through hole interconnecting with the ventilation hole to allow an inflation gas to enter the tire.

With the structure of the present invention disclosed above, the adjustable tire pressure detector of the present invention offers the following features.

Through the limiting contact surfaces and the assembly contact surfaces, the gas intake nozzle is limited during assembling. Further, an assembly angle of the gas intake nozzle is adjustable through adjusting a contact position of the arched assembly surface and the assembly surface, the adjustable tire pressure detector may be installed on tire rims in different sizes.

The foregoing, as well as additional objects, features and advantages of the invention will be more readily apparent from the following detailed description, which proceeds with reference to the accompanying drawings.

BRIEF DESCRIPTION OF THE DRAWINGS

FIG. 2 is a side view of an adjustable tire pressure detector according to the embodiment of the present invention;

DETAILED DESCRIPTION OF THE PREFERRED EMBODIMENTS

Figure 1:
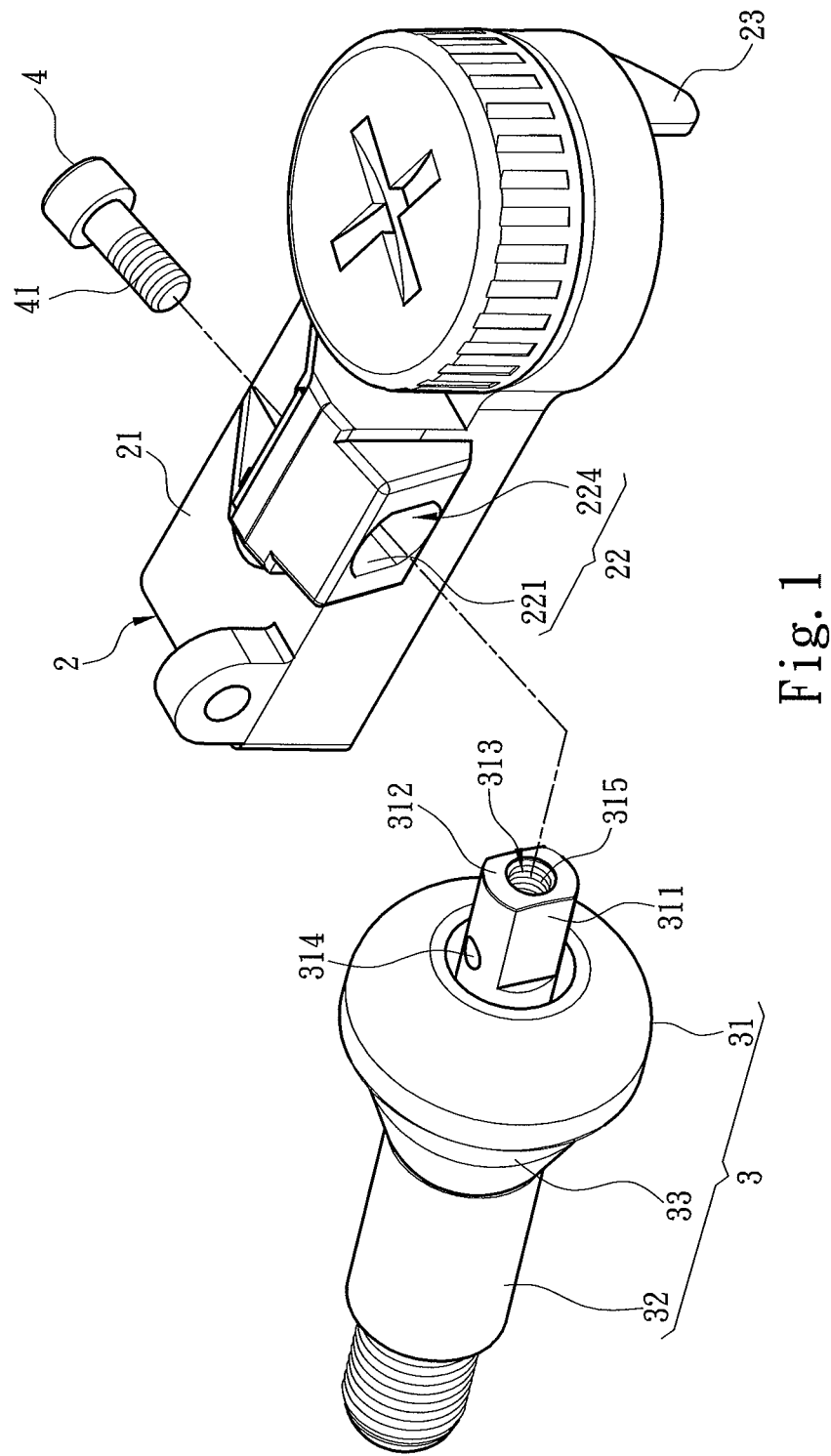
FIG. 1 is a schematic view of an adjustable tire pressure detector according to an embodiment of the present invention.

Referring to FIGS. 1 and 2, an adjustable tire pressure detector of the present invention is installed on a tire rim 11. The tire rim 11 includes two fastening sections 111 at two sides to engage with a tire bead of a tire (not shown), a connecting section 112 connecting the two fastening sections 111, and an assembly through hole 113 disposed at one of the fastening sections 111. The adjustable tire pressure detector includes a detector body 2, a gas intake nozzle 3, and a gas nozzle assembly member 4. The detector body 2 includes a housing 21 and a gas nozzle assembly portion 22 formed on the housing 21. The gas nozzle assembly portion 22 includes two parallel limiting contact surfaces 221, at least one assembly surface 222 which connects the two limiting contact surfaces 221 and includes an opening 223 facing the assembly through hole 113, and an assembly space 224 surrounded by the two limiting contact surfaces 221 and the assembly surface 222. Further, the assembly space 224 of the gas nozzle assembly portion 22 forms in a shape similar to an ellipse. The gas intake nozzle 3 includes a coupling section 31 inserted into the assembly space 224 of the gas nozzle assembly portion 22, and a gas intake section 32 extending from the coupling section 31 towards the assembly through hole 113. The coupling section 31 includes two assembly contact surfaces 311 corresponding to and tightly pressing against the limiting contact surfaces 211, and at least one arched assembly surface 312 connecting the two assembly contact surfaces 311, including a ventilation hole 313 corresponding to the opening 223 and being in line contact with the assembly surface 222. The gas nozzle assembly member 4 penetrates through the opening 223 the gas nozzle assembly portion 22 and then couples with the ventilation hole 313 of the gas intake nozzle 3, so as to fasten the gas intake nozzle 3 onto the detector body 2.

Figure 3A:
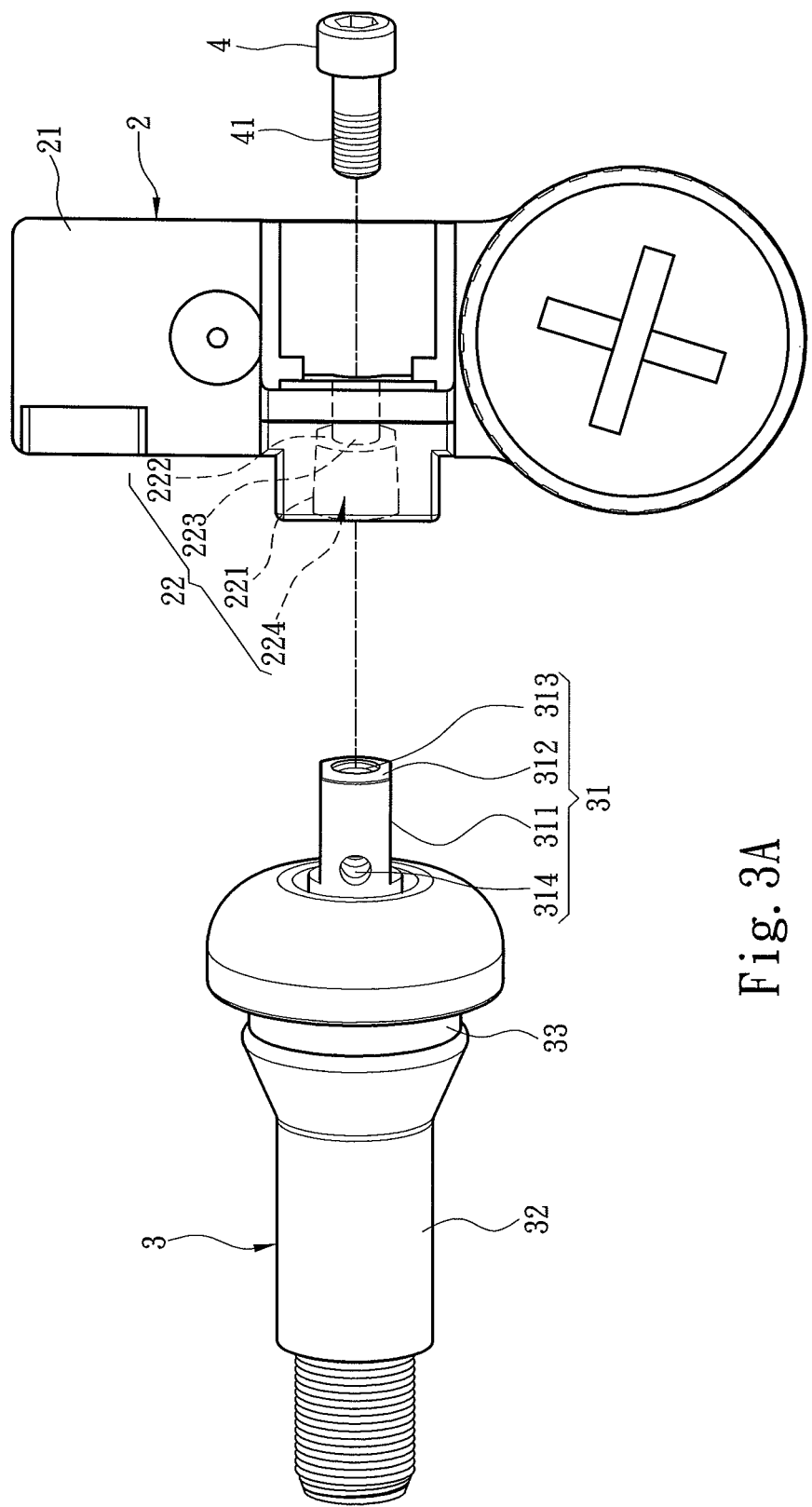
FIG. 3A is a top view of an adjustable tire pressure detector according to the embodiment of the present invention.
Figure 3B:
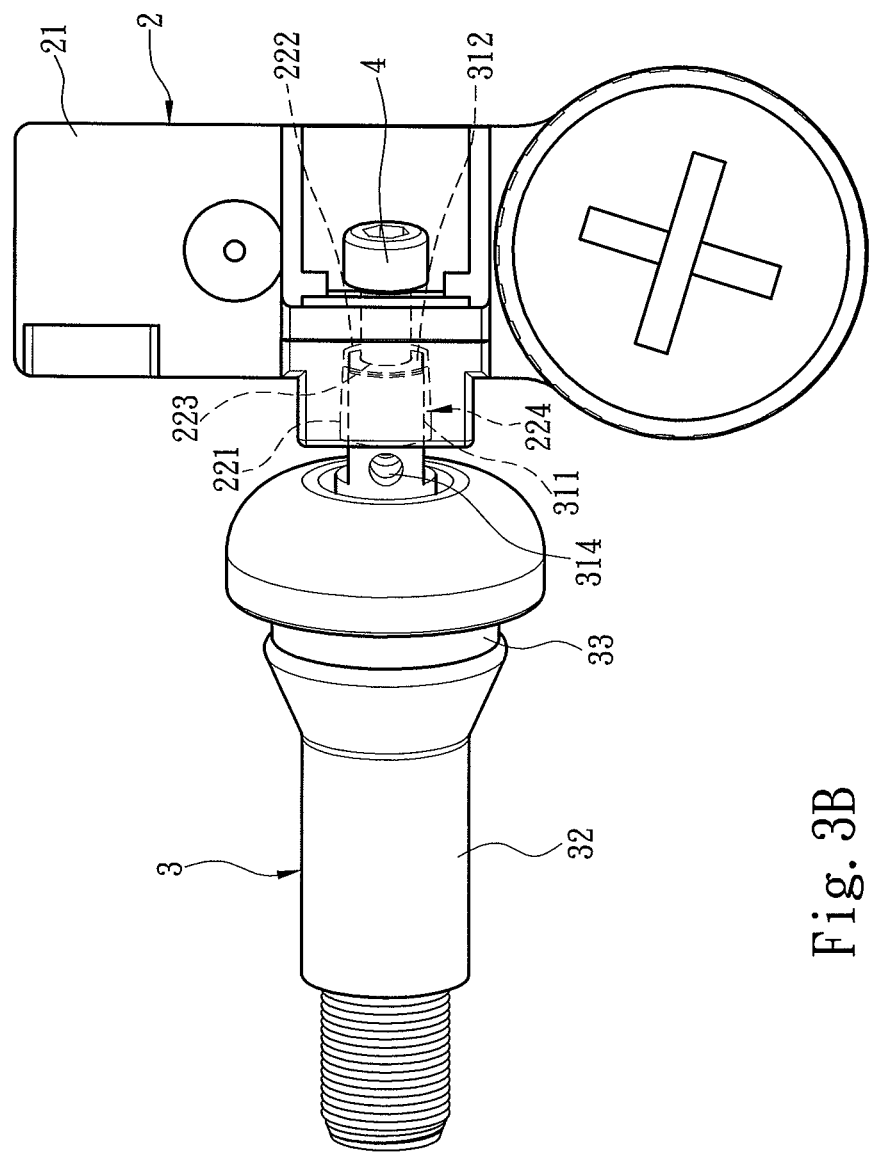
FIG. 3B is another top vide of an adjustable tire pressure detector according to the embodiment of the present invention.
Figure 4A:
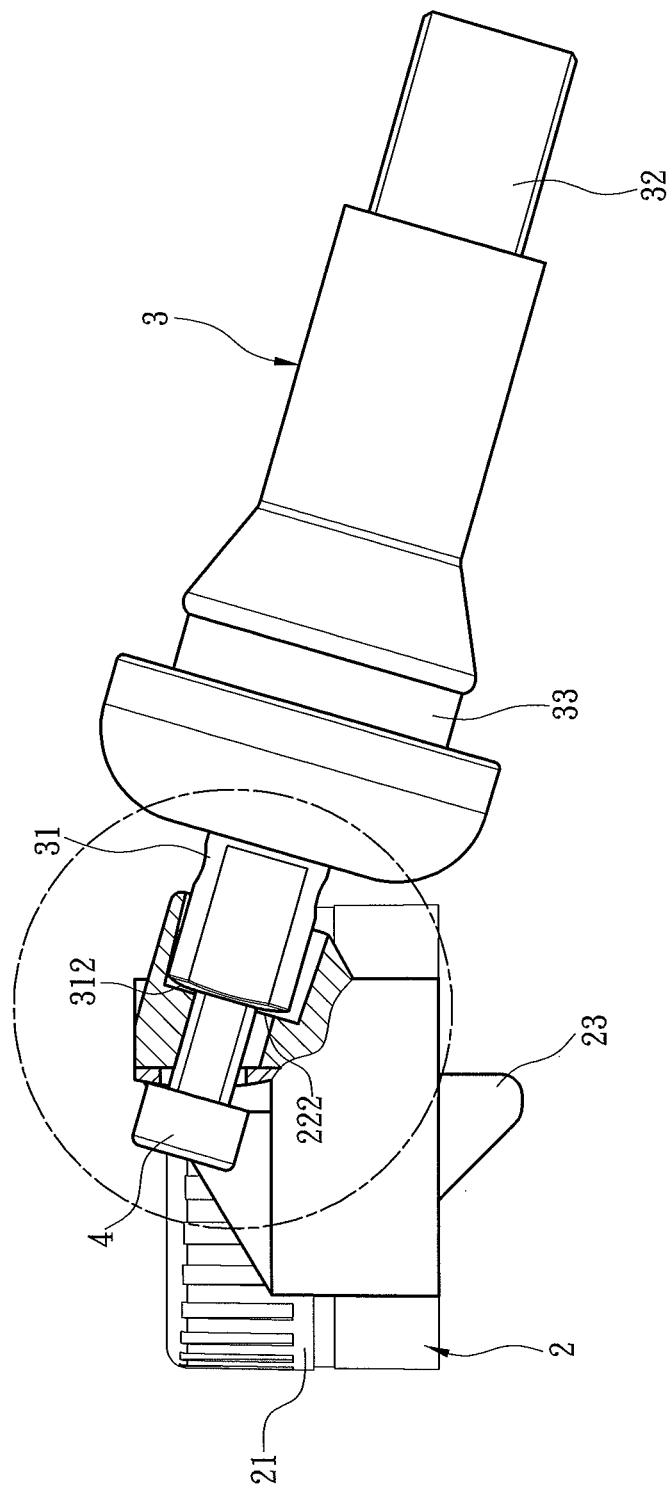
FIG. 4A is another side view of an adjustable tire pressure detector according to the embodiment of the present invention.
Figure 4B:
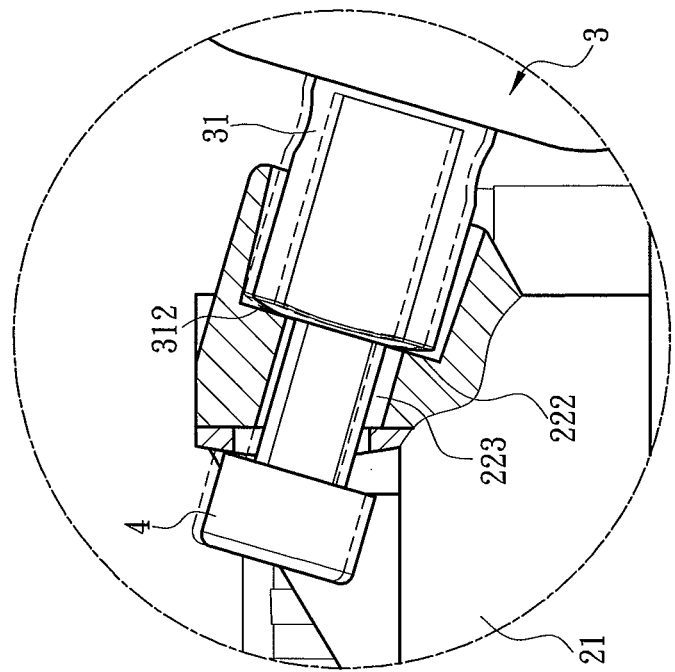
FIG. 4B is an enlarged partial side view of an adjustable tire pressure detector according to the embodiment of the present invention.
Figure 4C:
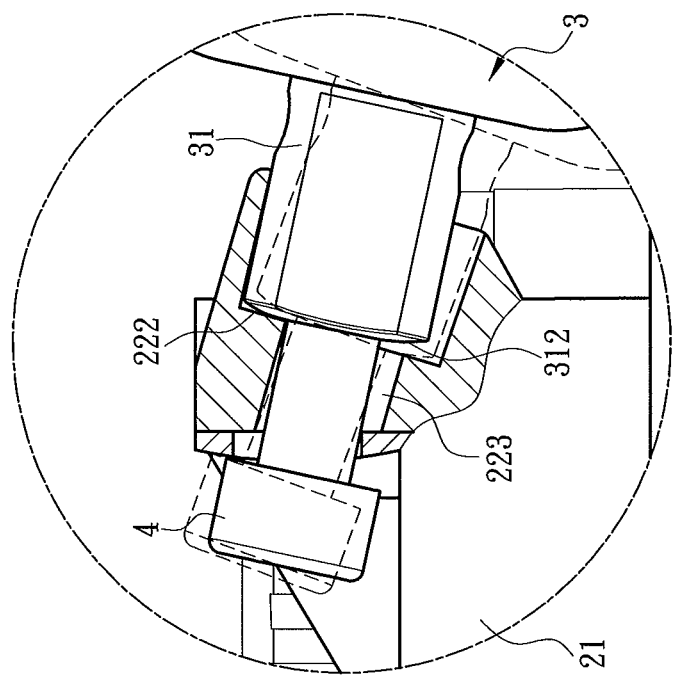
FIG. 4C is another enlarged partial side view of the adjustable tire pressure detector according the embodiment of the present invention.

Referring to FIGS. 3A and 3B, when assembling the adjustable tire pressure detector of the present invention, the gas intake nozzle 3 is corresponded with the assembly through hole 113 so that the coupling section 31 passes through the assembly through hole 113 to be inserted into the assembly space 224. The ventilation hole 313 is corresponded with the opening 223, and the gas nozzle assembly member 4 is assembled from the inside of the tire towards the gas intake nozzle 3, then penetrates the opening 22 of the gas nozzle assembly portion 22 and couples with the ventilation hole 313 to complete the assembly of the gas intake nozzle 3 and the detector body 2. As such, a high-pressure gas for inflating may be pumped into the tire via the gas intake nozzle 3, and the pressure of the pumped gas may be detected during pumping. Referring to FIGS. 4A to 4C, an assembly angle of the gas intake nozzle 3 and the detector body 2 may be adjusted according to the size of the tire rim 11. An angle at which the gas intake nozzle 3 enters the assembly space 224 can be adjusted during assembling the gas intake nozzle 3, that is, a position at which the arched assembly surface 312 comes into contact with the assembly surface 22 is adjusted, such that the gas intake nozzle 3 is allowed to move in the assembly space 224 to adjust to a preferred assembly angle. In addition, instead of corresponding to the size of the assembly space 224, the size of the gas intake nozzle 3 may be smaller than that of the assembly space 224, so that the gas intake nozzle 3 is capable of moving levelly to be adjusted to an appropriate assembly position during assembling.

The detector body 2 further includes a support section 23 extending towards the connecting section 112 to separate the detector body 2 from the tire rim 11 by a distance. The support section 23 includes a buffer member 231 abutting against the connecting section 112. The buffer member 231 is disposed to alleviate the jittering of the tire rim 11 which may damage of the detector body 2 during a driving process. Further, the gas intake nozzle 3 further includes a limiting fixing section 33 and a gas outlet through hole 314. The limiting fixing section 33 is disposed between the coupling section 31 and the gas intake section 32 to engage with the assembly through hole 113. The gas outlet through hole 314 is interconnected with the ventilation hole 313 and allows an inflation gas to enter the tire. In addition, the gas nozzle assembly member 4 further includes an outer screw thread 41, and the ventilation hole 313 includes an inner screw thread 315 for screwing with the outer screw thread 41.

In conclusion, an adjustable tire pressure detector of the present invention is installed on a tire rim, and includes a detector body, a gas intake nozzle, and a gas nozzle assembly member for fastening the gas intake nozzle onto the detector body. The detector body includes a housing and a gas nozzle assembly portion. The gas nozzle assembly portion includes two parallel limiting contact surfaces, an assembly surface connecting the two limiting contact surfaces and including an opening, and an assembly space surrounded by the two limiting contact surfaces and the assembly surface. The gas intake nozzle includes a coupling section inserted in the assembly space and a gas intake section connected to the coupling section. The coupling section includes two assembly contact surfaces corresponding to the limiting contact surfaces, and an arched assembly surface connecting the two assembly contact surfaces, including a ventilation hole corresponding to the opening and being in line contact with the assembly surface. Thus, the adjustable tire pressure detector of the present invention is able to be installed on tire rims in different sizes.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. An adjustable tire pressure detector installed on a tire rim, the tire rim including two fastening sections at two sides to engage with a tire bead of a tire, a connecting section connecting the two fastening sections, and an assembly through hole at one of the fastening sections, the adjustable tire pressure detector comprising:
   a detector body, disposed at the fastening sections, comprising:
      a housing; and
      a gas nozzle assembly portion, formed on the housing, comprising two parallel limiting contact surfaces, an assembly surface connecting the two limiting contact surfaces and including an opening facing the assembly through hole, and an assembly space surrounded by the two limiting contact surfaces and the assembly surface;
   a gas intake nozzle, comprising:
      a coupling section, inserted into the assembly space, comprising two parallel assembly contact surfaces corresponding to and tightly pressing against the limiting contact surfaces, an arched assembly surface connecting the two assembly contact surfaces, and a ventilation hole formed on the arched assembly surface and corresponding to the opening, wherein the arched assembly surface is located at a distal end of the coupling section and is in line contact with the assembly surface; and a gas intake section, extending from the coupling section towards the assembly through hole; and a gas nozzle assembly member, penetrating through the opening to couple with the ventilation hole to fasten the gas intake nozzle onto the detector body.

2. The adjustable tire pressure detector of claim 1, wherein the detector body comprises at least one support section extending towards the connecting section.

3. The adjustable tire pressure detector of claim 2, wherein the support section comprises a buffer member abutting against the connecting section.

4. The adjustable tire pressure detector of claim 1, wherein the gas nozzle assembly member comprises an outer screw thread, and the ventilation hole comprises an inner screw thread for screwing with the outer screw thread.

5. The adjustable tire pressure detector of claim 1, wherein the gas intake nozzle further comprises a limiting fixing section disposed between the coupling section and the gas intake section to engage with the assembly through hole.

6. The adjustable tire pressure detector of claim 1, wherein the gas intake nozzle further comprises an gas outlet through hole interconnecting with the ventilation hole to allow an inflation gas to enter the tire.

* * * * *